Figure 1:
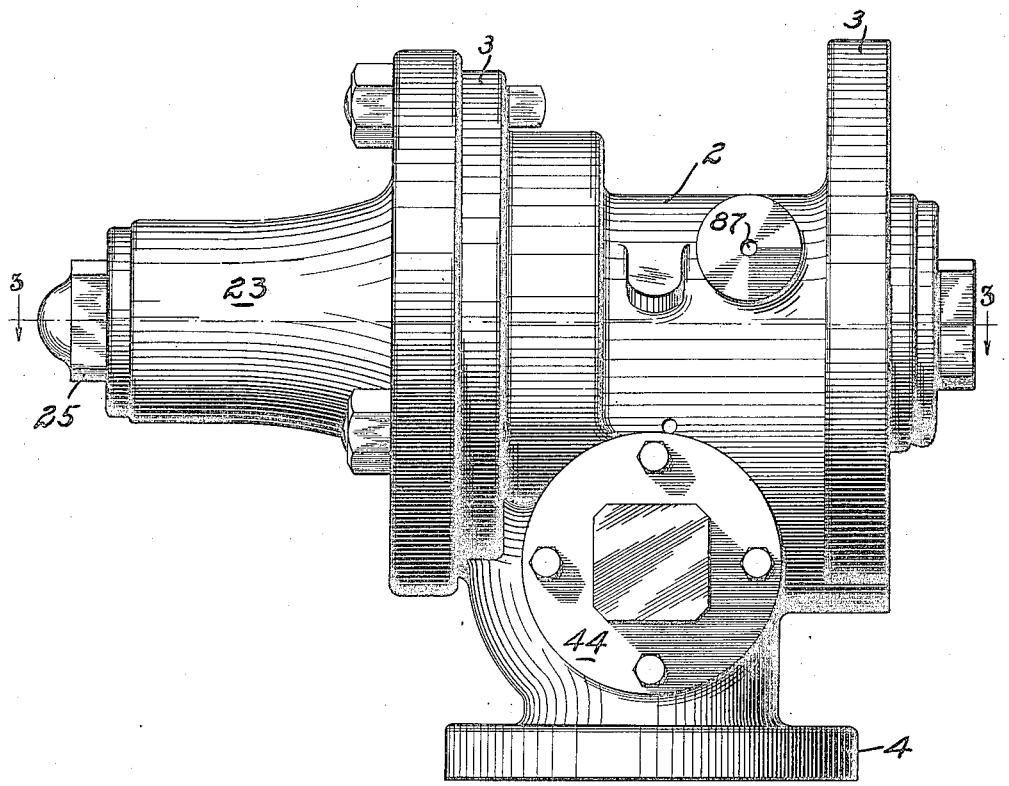

June 12, 1923.

T. J. STEINKELLER 1,458,370

AIR BRAKE CONTROL VALVE

Filed Feb. 14, 1921    5 Sheets-Sheet 1

WITNESS
H. Sherburne

INVENTOR
T. J. STEINKELLER
BY
White Prost & Evans
his ATTORNEYS

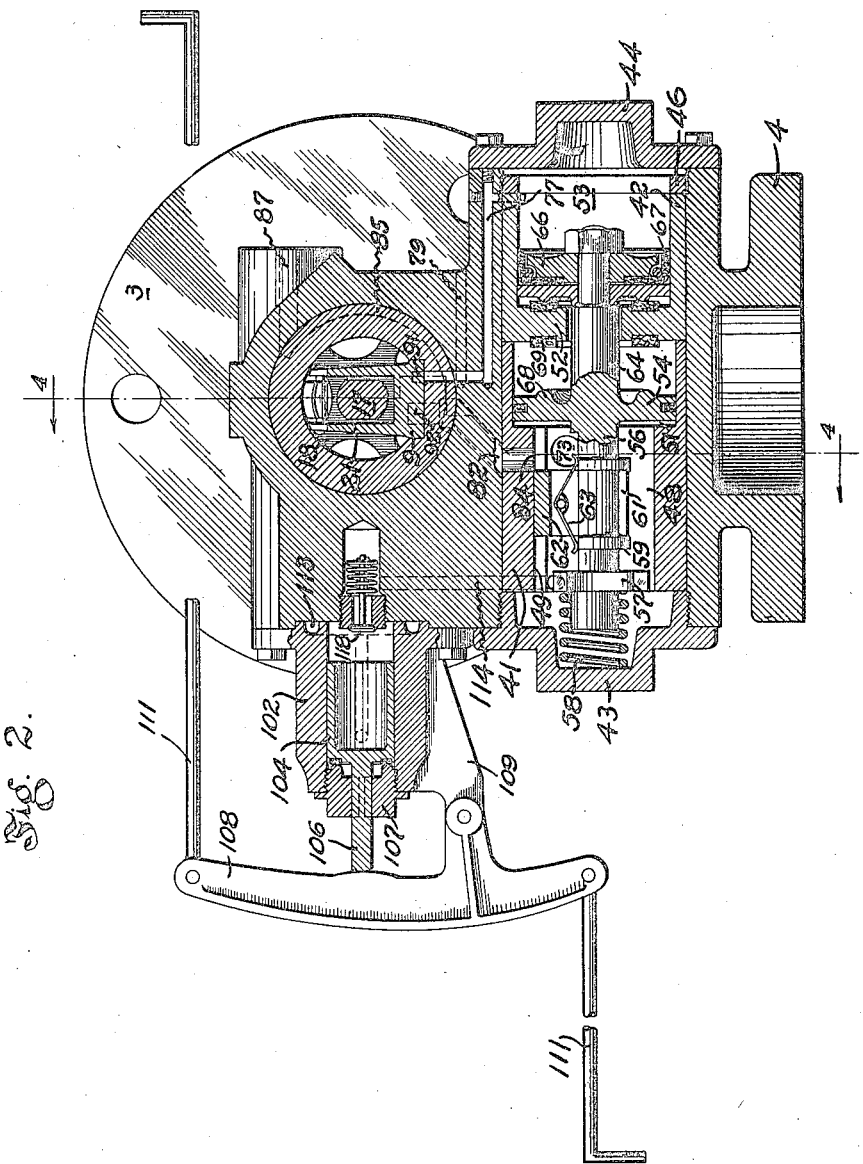

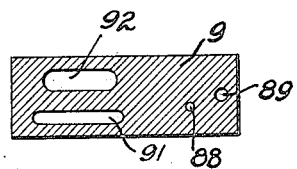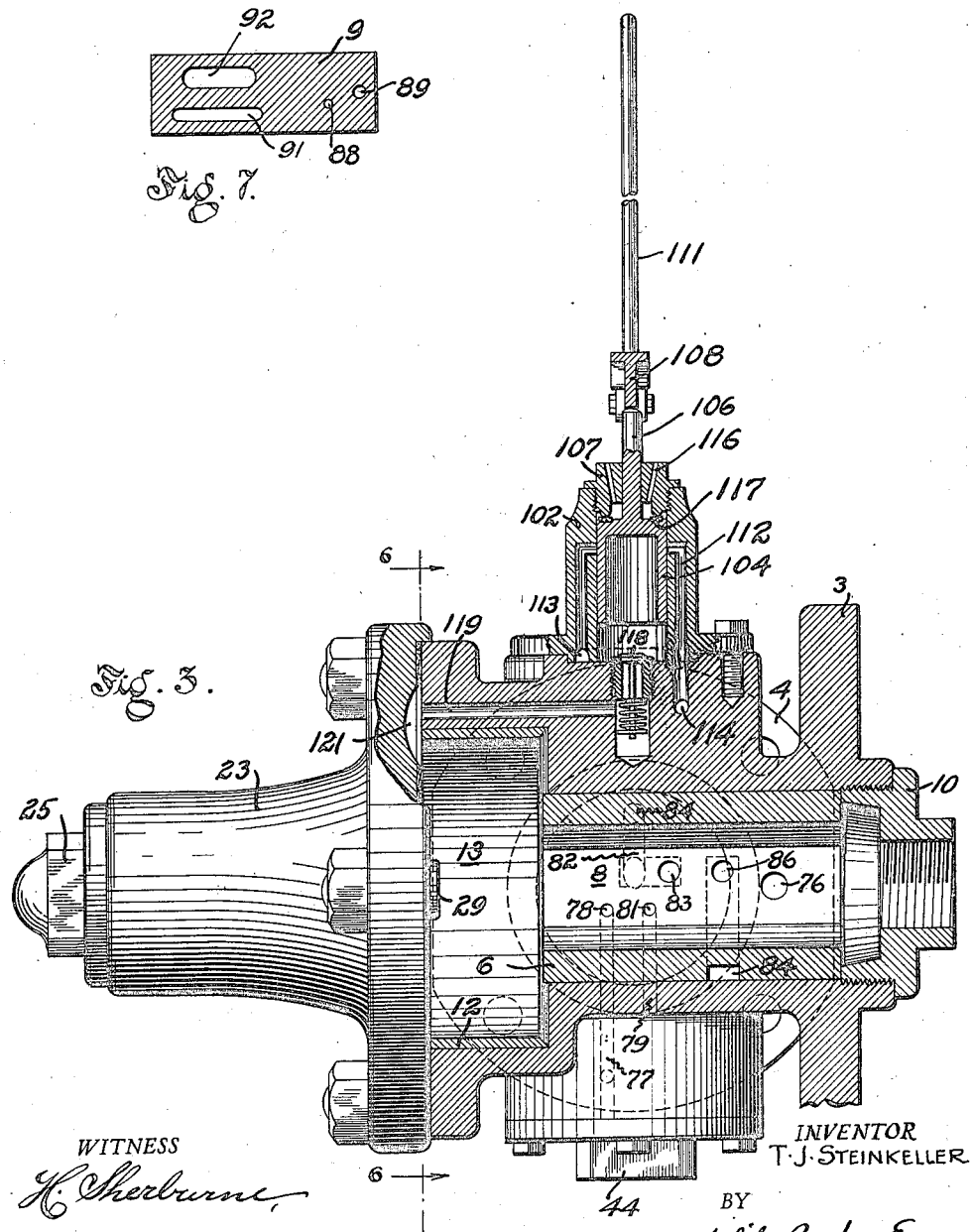

June 12, 1923.

T. J. STEINKELLER

AIR BRAKE CONTROL VALVE

Filed Feb. 14, 1921

1,458,370

5 Sheets-Sheet 4

WITNESS
H. C. Sherburne

INVENTOR
T. J. Steinkeller
BY
White Prost & Evans
his ATTORNEYS

June 12, 1923.

T. J. STEINKELLER

AIR BRAKE CONTROL VALVE

Filed Feb. 14, 1921

1,458,370

5 Sheets-Sheet 5

WITNESS:
H. Sherburne

INVENTOR
T. J. STEINKELLER.
BY
White Prost & Evans
his ATTORNEYS

Patented June 12, 1923.

1,458,370

UNITED STATES PATENT OFFICE.

THOMAS J. STEINKELLER, OF BERKELEY, CALIFORNIA, ASSIGNOR TO M. G. JEFFRESS, OF SAN FRANCISCO, CALIFORNIA.

AIR-BRAKE-CONTROL VALVE.

Application filed February 14, 1921. Serial No. 444,641.

*To all whom it may concern:*

Be it known that I, THOMAS J. STEINKELLER, a citizen of the United States, and a resident of Berkeley, county of Alameda, and State of California, have invented a new and useful Air-Brake-Control Valve, of which the following is a specification.

My invention relates to air brake apparatus.

The broad purpose of my invention is to provide a multiple function valve somewhat analogous to the triple valve of standard air brake equipment but characterized by greater flexibility, broader and more accurate control of the brakes and additional functions which will be clear from the following description. With my valve, the admission of air from the auxiliary reservoir to the brake cylinder and the release of the air from the brake cylinder may be closely controlled by the engineer at all times; and after a service or emergency application of the brakes, the auxiliary reservoir can be immediately recharged to full capacity, the brakes releasing automatically only after the auxiliary reservoir pressure has risen to a predetermined pressure in excess of that in the brake cylinder. If desired the brake cylinder pressure can be built up to full auxiliary reservoir pressure while the brakes are set. With standard equipment now in use, the brakes must be released or releasing to permit the auxiliary reservoir to be recharged. If circumstances call for repeated applications of the brakes, without sufficient recharging periods between, the engineer may be confronted with the problem of a heavy train accelerating on a dangerous piece of track and out of control because of empty or depleted reservoirs. The avoidance of such a contingency prompts the most stringent of operating rules, demands great skill in handling the air to avoid unnecessary losses of pressure, and to take advantage of every opportunity to recharge; and forces the adoption of various auxiliary devices, such as retainer valves and emergency reservoirs and related apparatus on passenger equipment. At best, however, the auxiliary reservoir pressure of, say, 90 pounds is the total resource of the engineer, without recharging and each application of the brakes lessens the reserve which is vital in maintaining control of his train. If level stretches, up-grades, or curves do not afford opportunity to release the brakes and recharge, disaster is imminent and probable.

With my valve, control of the train can never be lost. Following a small reduction of train line pressure, air is admitted to the brake cylinder and may be held there, released or increased as required. With a full service application the pressures in auxiliary reservoir and brake cylinder equalize to about 64 pounds (assuming full movement of the brake piston and a ratio of 2½ to 1). This pressure may be retained in the brake cylinder and recharging of the auxiliary reservoir immediately begun. The pressure cannot be released from the brake cylinder, until the auxiliary reservoir pressure exceeds it by a predetermined amount, say, 7 pounds, at which time, if recharging is continued, the brake cylinder pressure starts to release. If, however, another reduction occurs in the train line, the pressure in the auxiliary reservoir which now equals 71 pounds, and the brake cylinder pressure are again equalized to about 69 pounds and recharging may be again started. Thus the brake cylinder pressure may be built up by successive increments to full auxiliary reservoir pressure, but in any case the braking pressure cannot be released until the auxiliary reservoir pressure exceeds it by a predetermined amount, when it occurs automatically. As a result of this function, it is unnecessary to bleed the brakes on cars which are to be picked up without switching by a locomotive, since the brakes will automatically release when the auxiliary reservoir pressure is augmented to the required excess. Other and correlated means are provided, however, for bleeding the brake cylinder when that is necessary. My valve also permits the engineer with a long train to release the brakes at the rear of his train before those on the leading cars, thus avoiding a dangerous condition which may confront him with present equipment. Substantially 15% of the power generated by the locomotive boiler is consumed by the compressors with the present equipment. My valve permits complete control of the train with much higher economy of air, so that one of its advantages may be expressed in terms of fuel saved.

My invention possesses many other objects and features of advantage, some of which, with the foregoing, will be set forth in the following description of my invention. It is to be understood that I do not limit myself to the showing made by the said description, as I may adopt variant forms of my invention within the scope of the claims.

Figure 4:
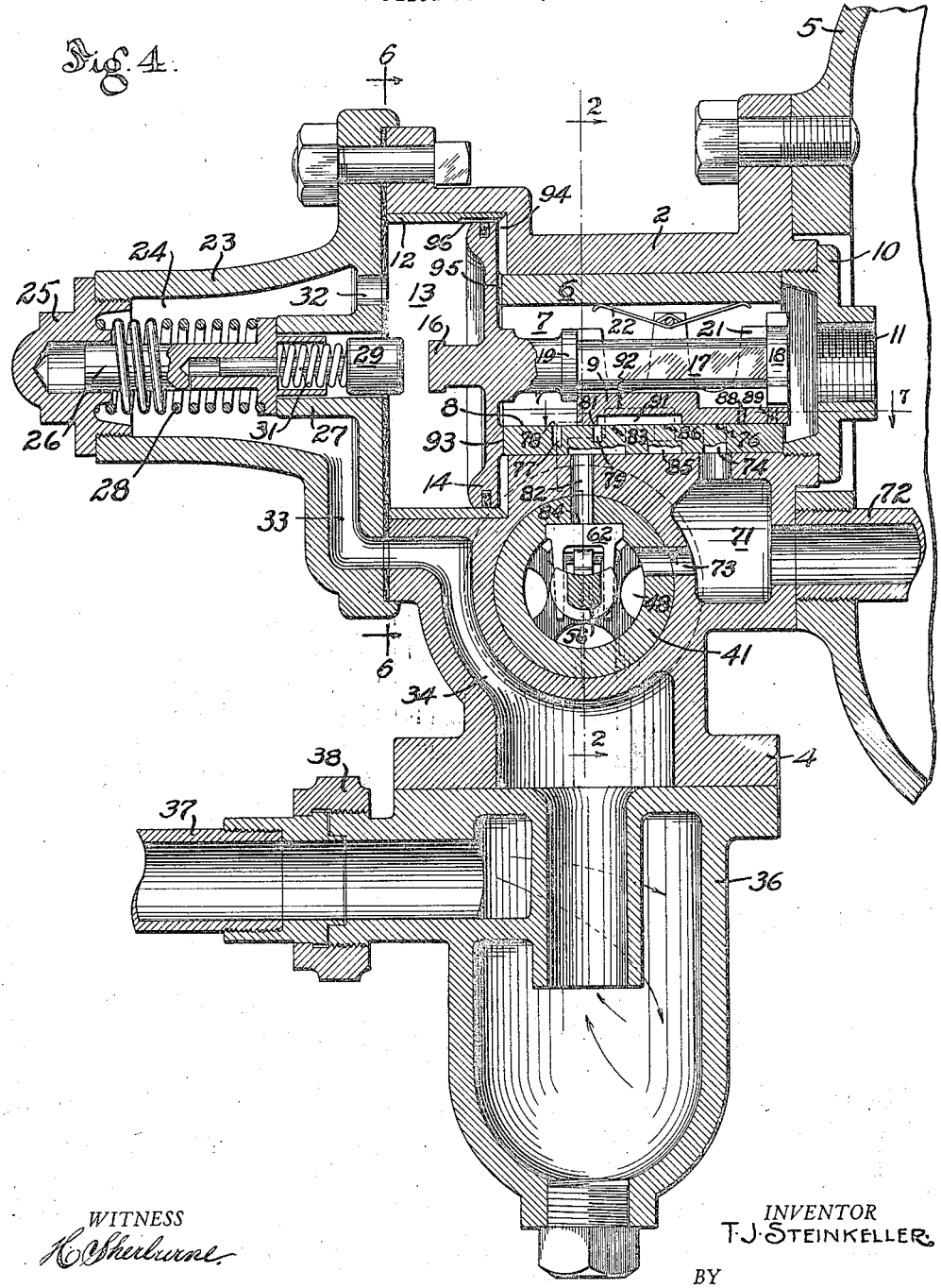
Figure 6:
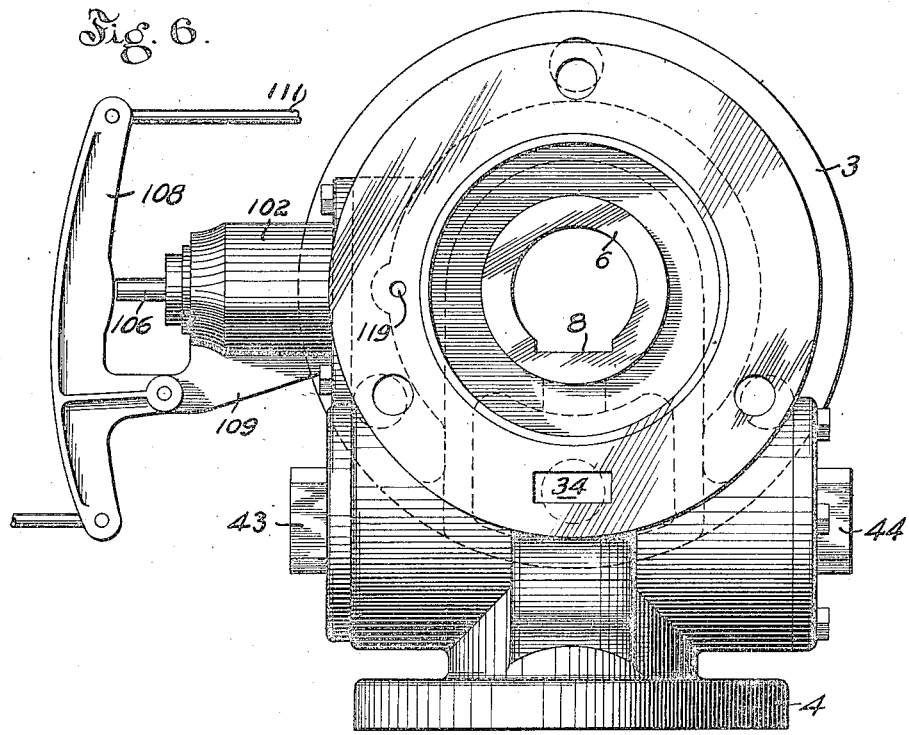
Figure 5:
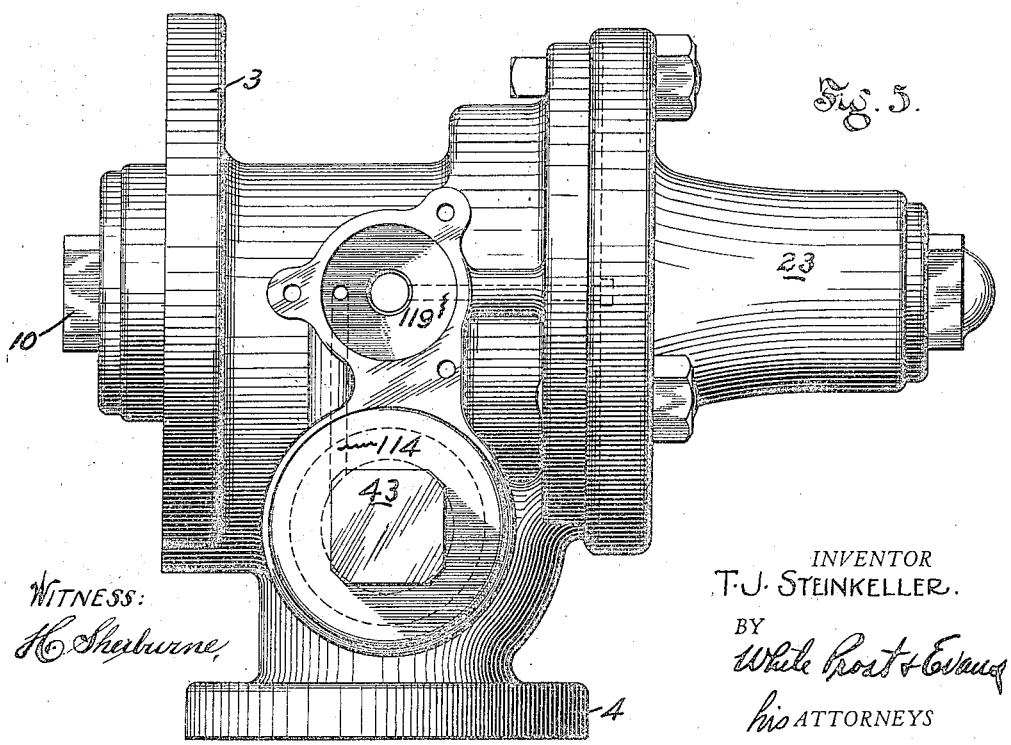

In the drawings, Fig. 1 is a right side elevation of my valve, detached from other apparatus. Fig. 2 is a vertical sectional view, the plane of section being indicated by the line 2—2 of Fig. 4. Fig. 3 is a horizontal sectional view, the plane of section being indicated by the line 3—3 of Fig. 1. Portions of the internal structure are omitted. Fig. 4 is a vertical sectional view of my valve as installed, showing the adjacent end of the auxiliary reservoir and the train line connection thru the dust collector. The plane of section is indicated by the line 4—4 of Fig. 2. Fig. 5 is a left side elevation of my valve detached, the bleeder valve being omitted. Fig. 6 is a vertical sectional view, the plane of section being indicated by the line 6—6 of Fig. 4. Fig. 7 is a sectional view of the valve, the plane of section being indicated by the line 7—7 of Fig. 4.

The device of my invention comprises a housing 2 formed with parallel flanges 3 and flange 4 perpendicular thereto, this formation being adapted to facilitate handling the housing in the various machining operations necessary to prepare the part for assembling. The right flange 3 as viewed in Fig. 4 is arranged to be bolted flush against the end of the auxiliary reservoir 5; and in line with the longitudinal axis thereof, the housing is formed with a bore in which fits the bronze bushing 6 enclosing the chamber 7 and containing the valve seat 8 for the control slide valve 9. A ring 10, threaded at 11 to receive a temporary plug during shipment, is threaded into the end of the bore against the bushing. The chamber 7 is thus in free communication with the auxiliary reservoir. The bore is concentrically enlarged at the outer end (left of Fig. 4) to carry the bushing 12, enclosing chamber 13 in which the operating piston 14 is slidably disposed. The piston is formed with a stud 16 projecting axially to the left and with a shaft or rod 17 extending to the right thru chamber 7 and terminating in a spider 18 slidable in the bushing 6. Disposed between the spider and the flange 19 are the abutments 21 of the slide valve which is pressed resiliently upon its seat by the spring 22 interposed between the valve and the bushing 6. The outer end of the housing is closed by the cup 23, containing chamber 24, and in the end of which the cap 25 is threaded. Slidably arranged in the cup is the flanged secondary bumper 26 axially alined with the piston 14 and resiliently pressed to a seat on the hollow boss 27 by the relatively heavy spring 28. Slidably arranged in the bumper 26 and boss 27 is a primary bumper 29, resiliently pressed to the right and toward the stud of the control piston by the relatively light spring 31. Cup chamber 24 is connected by passage 32 with chamber 13 and by registered passages 33 and 34 with the centrifugal dust collector 36 into which the train line branch pipe 37 is connected by coupling 38. Thus pressure of air on either side of operating piston 14, effects a corresponding movement of the valve 9.

The housing is also formed with a bore extending laterally therethru, below and preferably at right angles with the bores first referred to. In this bore are fitted two contiguous and alined bushings 41 and 42, and the ends are closed by threaded cap 43 at one end, and cap 44 held by screws at the other end. A hollow nut 46 below the cap 44 presses the two bushings 41 and 42 tightly together. The left side (as in Fig. 2) of bushing 41 encloses chamber 48 and contains the valve seat 49. The right side is enlarged into the cylindrical chamber 51. The bushing 42 is formed with a flange 52 which divides the chamber 51 from the cylindrical chamber 53 which is of considerably less diameter than the chamber 51.

Slidably arranged in chamber 51 is a piston 54, from which a shaft 56 projects to the left, terminating in a spider 57 slidable in the bushing. A coil spring 58 is interposed between the end of the shaft and the cap 43 and tends to push the shaft to the right. A flattened section of the shaft between flanges 59 is disposed between abutments 61 of the slide valve 62, which is resiliently pressed against the valve seat 49, by the spring 63 interposed between the valve and the shaft. On the opposite side of piston 54 a shaft 64 extends thru the opening in the bushing flange 52 and is provided with a piston 66 slidable in the chamber 53. The piston 66 is formed with a spring expanded leather cup 67 to prevent leakage of air past it, and for the same purpose both pistons 54 and 66 are provided on their adjacent faces with annular ridges 68 adapted to engage yielding gaskets 69 fixed in opposite sides of the flange 52. Thus air pressure in chambers 48 and 53, as augmented or lessened by the spring 58, effects a movement of the valve 62, and it will be noted that because of the difference in the size of the pistons, it will take a correspondingly higher pressure in chamber 53 to move the valve than in chamber 51 where a larger piston area is affected. The respective areas are calculated to make this differential about 7 pounds. Regarded alone, or with all the cars on a train equipped with my valve, the spring 58 is not essential in the operation of my device, but it is included in order to better correlate the action of my valves with standard equipment triple valves in a train in which both types are present.

The housing 2 is also formed with a chamber 71 which opens into the end of the brake cylinder pipe 72 when the device is bolted on to the auxiliary reservoir. The passage 73 connects this chamber with chamber 48, and a passage 74 thru the chamber wall and bushing 6, connects the chamber 71 with chamber 7, opening on the valve seat 8 in port 76. Passage 77 opening on the valve seat 8 in port 78 opens at the other end into chamber 53, and passage 79 opening on the valve seat 8 in port 81 leads to the open air. A passage 82 opening at one end on the valve seat 8 in port 83, opens at the other end on the valve seat 49 in the port 84. The bushing 6 is formed with a passage 85 opening on the valve seat 8 in the port 86 and registering with a passage 87 leading to the open air. The valve 9 is provided with a small aperture 88 and a larger aperture 89. Movement of the valve alines one of these apertures with port 76, or entirely uncovers the port. The lower face of the valve is formed with a recess 91 adapted to be registered with both ports 78 and 81, and movement of the valve may uncover port 78. The valve is also provided with a larger recess 92 which may be registered with both ports 83 and 86.

The piston 14 is stopped on its movement to the right (of Fig. 4) by engagement of the annular boss 93 with the end of the bushing 6, which projects somewhat from the end of the bore, so that even in its extreme position a passage 94 is left between the right face of the piston and the housing. The boss 93 is interrupted at 95 to continue this passage into chamber 7 and a short groove 96 in the bushing 12 completes a passage from one side of the piston to the other in the position shown in Fig. 4.

With the brakes off, the parts are in the positions shown in Figs. 2 and 4. Assume train line and auxiliary reservoir pressures of 90 pounds, the train line being in communication with the auxiliary reservoir thru passage 96. Port 78 is uncovered, and hence air from the train line has passed to chamber 53, exerting pressure on piston 66 and retaining it in its extreme left position in which the port 84 is uncovered by the valve 62. The valve 9 being in its extreme right position, the brake cylinder is in communication with the open air thru passages 71—73—48—82—92—85—87.

If the engineer wishes to make a light application of the brakes, he makes a reduction of, say, 10 pounds, in the train line pressure. Thus unbalanced, the piston 14 and connected valve 9 move to the left (Fig. 4) engaging the primary bumper 29 and compressing its spring 31, and closing passage 96 and exhaust port 86, and registering port 88 with port 76. Air from the auxiliary reservoir now flows into chamber 71 and thence to the brake cylinder until the pressures in chambers 7 and 13 are the same when the bumper spring 31 moves the piston and valve slightly to the right, covering all ports. If the engineer has, in the meantime moved his valve to lap position, to hold the train line pressure at 80 pounds, the 10 pound pressure is held in the brake cylinder, with 80 pounds in the auxiliary reservoir. Increase in train line pressure moves piston 14 to extreme right, opening passage 96 to permit recharging of the auxiliary reservoir, closing port 76, and opening port 86 to permit the brake cylinder to exhaust. If however a further reduction of, say, 10 to 15 pounds, is made in the train line pressure, for a full service application of the brakes, the unbalanced piston 14 and valve is forced still further to the left so that the secondary bumper spring 28 is compressed, and registering the larger port 89 with port 76, permitting the pressures in auxiliary reservoir and brake cylinder to equalize to about 64 pounds in each. This movement of the valve registers the recess 91 with both ports 78 and 81, thus placing chamber 53 in communication with the open air. Since passage 73 is open at all times, the pressure against the left face (Fig. 2) of piston 54 is that of the chamber 71 and brake cylinder, and this pressure now forces the differential pistons 54 and 66 and the attached valve 62 to the right, closing the brake cylinder exhaust port 84. If the train line reduction was 25 pounds the pressure therein dropped to 65 pounds and just before the pressures in auxiliary reservoir and brake cylinder were fully equalized, the control piston 14 and valve 9, under the influences of the bumper springs, were moved back nearly to the extreme right position, all ports being covered. This movement registers the recess 92 with ports 83 and 86 but since the intervening exhaust port 84 has been closed by the valve 62, the brake cylinder cannot exhaust, and the brakes are held on.

As soon as the pressures in the auxiliary reservoir and brake cylinder equalize, the engineer may start recharging the auxiliary reservoir by raising the train line pressure. This completes the return of the operating piston 14 to extreme right position, opening the passage 96 and uncovering port 78. Air is now flowing into the auxiliary reservoir to recharge it, and at the same time, the operative pressure of 64 pounds in the brake cylinder is unimpaired. As port 78 was uncovered air at auxiliary reservoir pressure flowed to chamber 53, and as the pressure in the auxiliary reservoir rises during the recharging, the pressure against the differential piston 66 is also augmented until the auxiliary reservoir pressure reaches 71 pounds, when the brake cylinder pressure of 64 pounds against the larger differential piston 54 is balanced. The engineer may now move his valve to lap, holding all parts in the positions described and maintaining the pressure of 64 pounds in the brake cylinder as long as necessary. Further increase in auxiliary reservoir pressure effects a gradual return of the differential pistons against the resistance of the spring 58 to the position shown in Fig. 2, uncovering the port 84 and permitting the brake cylinder to exhaust so that the brakes release. Recharging continues until the desired auxiliary reservoir pressure is attained.

Assume, now that instead of lapping his valve to hold the brakes on at 64 pounds pressure, the engineer desires to increase his braking pressure. The careful engineer will always immediately begin recharging as soon as the pressures in the auxiliary reservoir and brake cylinder equalize, lapping his valve if desired when his gauge shows an auxiliary reservoir pressure of 71 pounds, the differential pistons then being in balance as to air pressure. At this point he is prepared for any contingency, and may continue to hold the brakes at the brake cylinder pressure of 64 pounds, or continue recharging which will automatically release the brakes as explained above, or if need arises he may increase the braking pressure. This is done by making a reduction, say of 3 pounds in the train line pressure, bringing it to 68 pounds. The piston 14 and valve 9 thereupon move to the left, uncovering port 76 and permitting the auxiliary reservoir and brake cylinder pressures to again equalize to about 69 pounds, the bumper spring returning the valve a short distance to cover all ports. The air pressures against the differential pistons are the same (69 pounds) on both sides so that the valve 62 still covers the port 84. With the equalization of auxiliary reservoir and brake cylinder pressures, the engineer again begins recharging, and when his gauge indicates for the second time an excess auxiliary reservoir pressure of 7 pounds, he may if still more braking pressure is required make another reduction to once more equalize the auxiliary reservoir and brake cylinder pressures, this time to 74 pounds. Thus the engineer may rapidly build up his braking pressure with successive increments of 5 pounds, by alternately recharging to the predetermined excess, and equalizing before such excess increases sufficiently to operate the differential pistons to open the brake cylinder exhaust port.

For an emergency setting of the brakes, a heavy reduction is made, sufficient to move the operating piston 14 and valve 9 to its extreme left position. The entire port 76 is then uncovered and the pressures in auxiliary reservoir and brake cylinders equalize almost instantly, effecting the desired speedy application of the brakes. With the equalization of the pressures, the apparatus operates as already explained.

From the above it will be clear that aside from enabling the engineer to fully recharge the auxiliaries without releasing his brakes, or to augment the braking power to any desired extent beyond the first equalization pressure of 64 pounds, my valve provides other possibilities in train control which give it an importance of the first magnitude in the factors of safety, economy and efficiency. For instance, in a lengthy train with present equipment, a period of about three minutes may elapse between the release of the brakes on the first and last cars. This sometimes results in pulling the train in two. By proper manipulation of my valve, the engineer may effect the release of the brakes at the rear of his train before those at the front end. Thus, after a full service application, the pressures in the auxiliary reservoirs and brake cylinders on all cars are equalized to 64 pounds. The engineer then begins recharging. The auxiliary reservoirs on the forward cars first respond to the increased train line pressure, and when the pressures in these have increased sufficiently, but before the critical pressure at which the differential pistons in the first cars are operated, and before the pressure in the auxiliary reservoirs in the last cars have been materially or at all increased, the engineer makes a slight reduction, permitting the pressures in the auxiliary reservoirs and brake cylinders on the first cars to equalize say, to 68 pounds; but before the low pressure wave has had time to affect the operating pistons on the rear cars, increasing the train line pressure to again recharge all the auxiliary reservoirs. The equalized pressure in the first car is now 68 pounds, that in the last car 64 pounds, and the intermediate cars ranging between these two pressures. With the differential pistons calculated to balance on an excess auxiliary reservoir pressure of 7 pounds, it follows that the critical pressure for the automatic opening of the exhaust ports will be 71 pounds for the rear car and 75 pounds for the first car, with variant critical pressures between these figures for the intermediate cars depending on their position in the train. Therefore as the recharging proceeds, the differential pistons on the rear car begin to move to open the exhaust valve when the train line pressure passes 71 pounds, the differential pistons on each succeeding car, moving to open the related exhaust port as their critical pressures respectively are reached until the leading car differential pistons begin to operate at a pressure of 75 pounds. Thus the brakes are released, first on the rear cars, and then successively toward the head of the train, a most desirable condition of operation, and one not possible to secure with present equipment. Any lagging of the apparatus farthest removed from the locomotive as the train line pressure increases merely tends toward a simultaneous release of all the brakes, without changing the general beneficial result.

From what has been said, it will be clear that one or more cars left standing with brakes set may be picked up by a locomotive, and the brakes automatically released as soon as the critical pressure is passed in recharging the auxiliary reservoir without bleeding the brakes. Means are, however, provided for bleeding the brake cylinder (not the auxiliary reservoir) to release the brakes when it is necessary to move the car without coupling up the train line.

Secured on the face 101 of the housing 2 (left side Fig. 2 and top of Fig. 3) is a casing 102 enclosing a cylindrical chamber in which the piston 104 is slidably disposed. The piston is hollow to reduce its weight and is provided with a stem 106, extending thru the plug 107 which closes the outer end of the casing. The end of the stem is engaged by a lever 108 pivoted on an arm 109 extending from the casing. Links 111 pivoted to the opposite ends of the lever extend to the sides of the car and provide readily accessible handles with which the bleed valve may be opened.

Near the outer end, the piston chamber is connected by passages 112 with the annular groove 113 formed in the base of the casing, and which overlies the opening of the passage 114 which at the other end opens into the chamber 48, which, it will be remembered is in communication with the brake cylinder at all times. Passages 116 are formed in the plug 107, so that when the piston 104 is moved inwardly to uncover the passages 112 the brake cylinder is in communication with the open air. The end of the plug is formed with an annular flange, upon which seats an annular gasket 117 disposed on the end of the piston when the piston moves outwardly to cover the passages 112. At the inner end of the piston chamber a spring pressed check valve 118 is threaded into the housing 2 to control the flow of air thru the passage 119 which extends to the left face (Fig. 3) of the housing and is connected by a groove 121 in the base of the cup 23, with the chamber 13, which is always in communication with the train line. Normally, then, train line pressure is exerted on the inner end of the piston 104, pressing it outwardly and seating the gasket 117 on the annular flange so that no leakage to the open air can occur from either passage 119 or passage 114. The most important function of the check valve 118 is to prevent any undesired movement of the piston valve 104 when the train line pressure is reduce.

When it is desired to bleed the brakes, one of the links 111 is pulled out thus forcing in the piston valve 104 and uncovering the passages 112. The brake cylinder now exhausts into the open air thru passages 71—73—48—114—112—116, but it should be noted that the auxiliary reservoir pressure is preserved since the passages 74 and 96 are closed. Since there is no pressure in the train line, the piston valve 104 remains in the position to which a pull on the link 111 moves it, and a brakeman can therefore move rapidly along a string of cars, opening the bleed valve as he goes. When the car is again coupled to the locomotive, and recharging of the auxiliary reservoir begun, the air flows thru passages 121, 119 and thru the check valve 118, moving the piston valve 104 outwardly to its seat and closing the passages 112 and 116.

It is of course understood that the pressures stated in the foregoing are used for illustration, and that in practice the pressures will vary from those given. Initial pressure in train line and auxiliary reservoir, conditions of leakage, the ratio of auxiliary reservoir and brake cylinder capacities, the capacity of the connecting passages, and the distance thru which the air must move, all vary. The actual pressures will be the totalized effect of all these factors.

It should be noted that my control is designed to and will operate in the same system with standard equipment triple valves, so that a train may be composed of cars some of which are equipped with my control valve and others of which are equipped with the usual triple valves.

I claim:

1. An air brake control device comprising means responsive to brake cylinder pressure for closing the brake cylinder exhaust passage and responsive to auxiliary reservoir pressure for opening said exhaust passage, and means responsive to a difference in pressure between the train line and auxiliary reservoir for automatically effecting the application of pressure from the brake cylinder or the auxiliary reservoir to said first named means.

2. An air brake control device comprising a valve for controlling the brake cylinder charging passage, means responsive to a difference in pressure between the train line and auxiliary reservoir for moving said valve, a second valve for controlling the brake cylinder exhaust passage, means controlled by said first valve and responsive to brake cylinder pressure for closing said exhaust passage and responsive to auxiliary reservoir pressure for opening said exhaust passage.

3. An air brake control device comprising a housing formed with a charging passage for connecting the auxiliary reservoir and the brake cylinder and an exhaust passage for connecting the brake cylinder and the open air, a valve for controlling said passages, means responsive to a difference between train line and auxiliary reservoir pressure for operating said valve, a second valve for controlling said exhaust passage, and means responsive to brake cylinder pressure for operating said second valve to close said exhaust passage and responsive to auxiliary reservoir pressure when in excess of brake cylinder pressure for operating said valve to open said exhaust passage.

4. An air brake control device comprising a housing formed with a charging passage for connecting the auxiliary reservoir and the brake cylinder and an exhaust passage for connecting the brake cylinder and the open air, a valve for controlling said passages, means responsive to a difference between train line and auxiliary reservoir pressure for operating said valve, a second valve for controlling said exhaust passage, and differential pistons for operating said second valve and exposed on one side to brake cylinder pressure, said housing being formed with passages controlled by said first valve for exposing the opposite side of said differential pistons to auxiliary reservoir and to atmospheric pressures.

5. An air brake control device comprising means operated by auxiliary reservoir pressure for admitting air from the auxiliary reservoir to the brake cylinder, means operated by brake cylinder pressure for closing the brake cylinder exhaust passage, and means operated by auxiliary reservoir pressure for opening said brake cylinder exhaust passage.

6. An air brake control device comprising a housing formed with a chamber A in communication with the brake cylinder, and a chamber B in communication with the auxiliary reservoir, said housing formed with a passage L for connecting chamber B with the brake cylinder and a passage M for connecting chamber A at one end with the open air and a passage N for connecting chamber A at the opposite end with chamber B and with the open air, a valve in chamber B for controlling said passages, means movable by train line pressure in one direction and auxiliary reservoir pressure in the other direction for operating said valve, a valve in chamber A for controlling passage M, and differential means movable by brake cylinder pressure in one direction and by auxiliary reservoir pressure in the other direction for operating said last named valve.

7. An air brake control device comprising a valve for controlling the brake cylinder charging and exhaust passages, a second valve for controlling the brake cylinder exhaust passage, a piston responsive to a difference in pressure between the train line and auxiliary reservoir for operating said first valve, and differential pistons for operating said second valve and exposed on one side to brake cylinder pressure, passages controlled by said first valve for exposing the opposite side of said differential pistons to auxiliary reservoir pressure or to atmospheric pressure according to the position of said first valve.

8. An air brake control device comprising a valve for controlling the brake cylinder charging and exhaust passages, a second valve for controlling the brake cylinder exhaust passage, a piston responsive to a difference in pressure between the train line and auxiliary reservoir for operating said first valve, and differential pistons for operating said second valve and exposed on the larger side to brake cylinder pressure, passages controlled by said first valve for exposing the smaller side of said differential pistons to auxiliary reservoir pressure or to atmospheric pressure according to the position of said first valve.

9. An air brake control device comprising a valve for controlling the brake cylinder exhaust passage, differential piston means for operating said valve and exposed on one side to brake cylinder pressure, passages for exposing the opposite side of said differential means to auxiliary reservoir pressure or to atmospheric pressure, a valve for controlling said last named passages, and means responsive to the difference in pressure between the train line and the auxiliary reservoir for operating said last named valve.

10. An air brake control device comprising a valve for controlling the brake cylinder exhaust passage, piston means for operating said valve and exposed on one side to brake cylinder pressure, passages for exposing the opposite side of said piston means to auxiliary reservoir pressure and to atmospheric pressure, a valve for controlling said last named passages, and means responsive to the difference in pressure between the train line and the auxiliary reservoir for operating said last named valve.

11. An air brake control device comprising a valve for controlling the brake cylinder exhaust passage, piston means for operating said valve and exposed on one side to brake cylinder pressure, passages for exposing the opposite side of said piston means to auxiliary reservoir pressure or to atmospheric pressure, a valve for controlling said last named passages, means responsive to a difference in pressure between the train line and the auxiliary reservoir for operating said last named valve, and a spring for opposing movement of said piston means under auxiliary reservoir pressure.

12. An air brake control device comprising a valve for controlling the brake cylinder exhaust passage, piston means for operating said valve and exposed on one side to brake cylinder pressure, passages for exposing the opposite side of said piston means to auxiliary reservoir pressure or to atmospheric pressure, a valve for controlling said last named passages and the brake cylinder charging passage, and means responsive to the difference in pressure between the train line and the auxiliary reservoir for operating said last named valve.

13. An air brake control device comprising a valve for controlling the brake cylinder exhaust passage, piston means for operating said valve and exposed on one side to brake cylinder pressure, passages for exposing the opposite side of said piston means to auxiliary reservoir pressure or to atmospheric pressure, valve means for controlling said last named passages and the brake cylinder charging passage and the auxiliary reservoir charging passage, and means responsive to the difference in pressure between the train line and the auxiliary reservoir for operating said last named valve.

14. An air brake control device comprising a valve for controlling the brake cylinder exhaust passage, piston means for operating said valve and exposed on one side to brake cylinder pressure, passages for exposing the opposite side of said piston means to auxiliary reservoir pressure or to atmospheric pressure, a valve for controlling said last named passages, a piston responsive to the difference in pressure between the train line and the auxiliary reservoir for operating said last named valve, and a passage for connecting the train line to the auxiliary reservoir and controlled by said piston.

15. An air brake control device comprising a valve for controlling the brake cylinder exhaust passage, piston means for operating said valve and exposed on one side to brake cylinder pressure, passages for exposing the opposite side of said piston means to auxiliary reservoir pressure or to atmospheric pressure, a valve for controlling said last named passages, a piston responsive to the difference in pressure between the train line and the auxiliary reservoir for operating said last named valve, a passage for connecting the train line to the auxiliary reservoir and controlled by said piston, a bleed passage for connecting the brake cylinder to the open air, a piston valve for controlling said bleed passage and exposed on one side to train line pressure, and manually operated means for moving the piston valve to open said bleed passage.

16. An air brake control device comprising a valve for controlling the brake cylinder exhaust passage, piston means for operating said valve and exposed on one side to brake cylinder pressure, passages for exposing the opposite side of said piston means to auxiliary reservoir pressure or to atmospheric pressure, a valve for controlling said last named passages, means responsive to the difference in pressure between the train line and the auxiliary reservoir for operating said last named valve, a bleed passage for connecting the brake cylinder to the open air, a piston valve for controlling said bleed passage and exposed on one side to train line pressure, and manually operated means for moving the piston valve to open said bleed passage.

17. In an air brake system the combination with means for charging and recharging the auxiliary reservoir and admitting to and exhausting from the brake cylinder air from the auxiliary reservoir, means responsive to brake cylinder pressure for closing the brake cylinder exhaust passage and responsive to auxiliary reservoir pressure for opening said exhaust passage.

18. In an air brake system, the combination with means for charging and recharging the auxiliary reservoir and admitting to and exhausting from the brake cylinder air from the auxiliary reservoir, means exposed and responsive to brake cylinder pressure on one side to close the brake cylinder exhaust passage and responsive to auxiliary reservoir pressure on the opposite side to open said exhaust passage, and means controlled by said first named means for subjecting said responsive means to auxiliary reservoir or atmospheric pressure.

19. An air brake control device comprising a valve for controlling the exhaustion of air from the brake cylinder, piston means exposed on one side to brake cylinder pressure for operating said valve, and means responsive to the difference in pressure between the train line and auxiliary reservoir for controlling the flow of air from the train line to the auxiliary reservoir and to the opposite side of said piston means and the exhaustion of the air from said opposite side of said piston means.

In testimony whereof, I have hereunto set my hand.

THOMAS J. STEINKELLER.